May 22, 1951  J. E. STORMENT  2,554,425
LIQUID LEVEL CONTROL
Filed Dec. 28, 1948
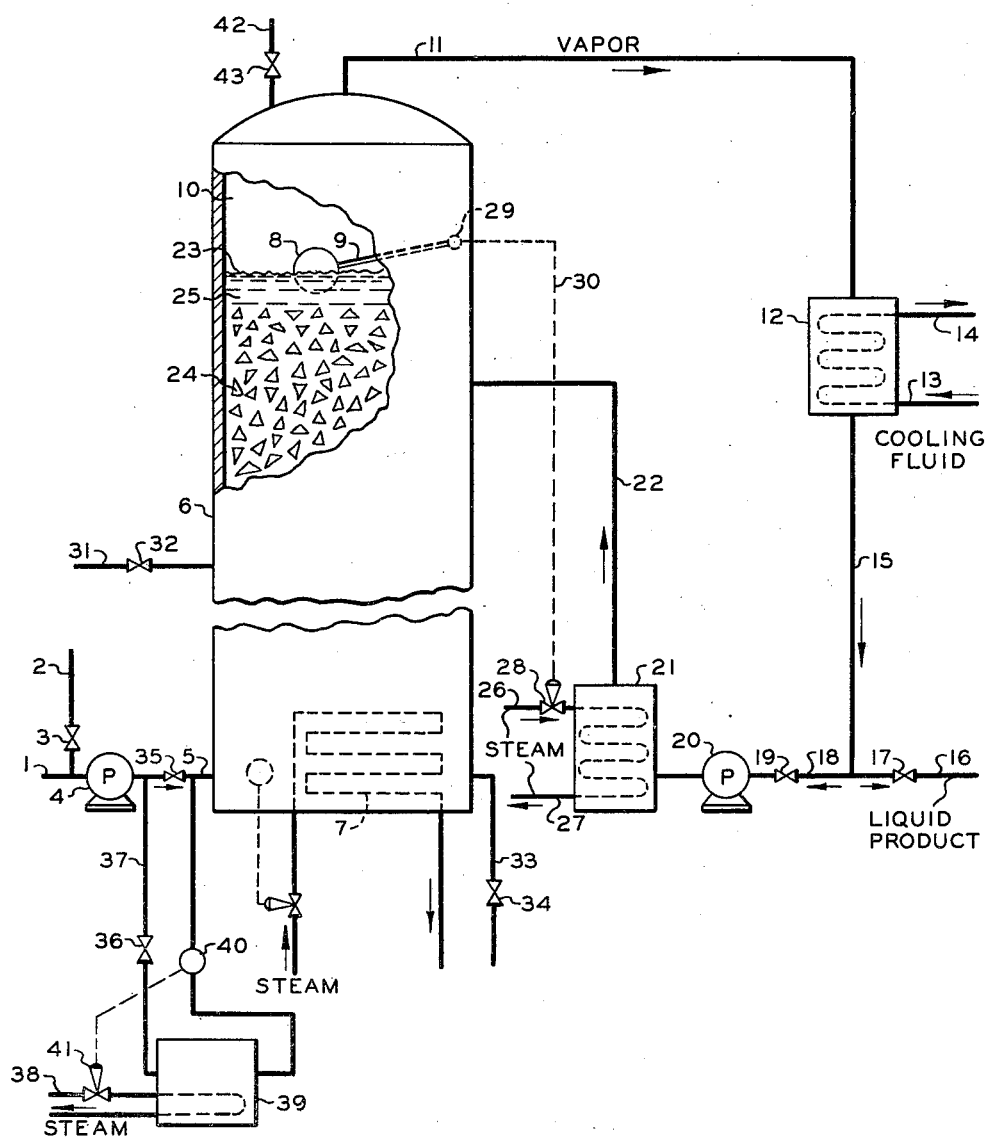
INVENTOR.
J.E. STORMENT
BY Hudson & Young
ATTORNEYS Patented May 22, 1951

2,554,425

UNITED STATES PATENT OFFICE 2,554,425

LIQUID LEVEL CONTROL

Joseph E. Storment, Kansas City, Kans., assignor to Phillips Petroleum Company, a corporation of Delaware Application December 28, 1948, Serial No. 67,693

6 Claims. (Cl. 260—683.5)

This invention relates to methods of and apparatus for controlling the liquid level in a tower or other chamber in which evaporation is taking place. It has particular relation to the control of the liquid level in a packed tower or reactor chamber wherein isomerization, fractionation, catalytic action, stripping or various chemical reactions may occur.

This application is a continuation in part of my copending application Serial No. 527,121, filed March 18, 1944, now Patent 2,473,737 of June 21, 1949. My copending application Serial No. 575,507, filed January 31, 1945, now Patent 2,508,434 of May 23, 1950, is related in that the same general result is accomplished by vapor injection through spray heads, a different process and different apparatus.

In the prior art, attempts have been made to control the fluid level in a packed tower or column by controlling the temperature of the entering liquid feed. There is such a large lag between the time the heated liquid feed enters the bottom of the column until its addition is effective at the top of the column that this method causes the fluid level in the packed column to vary considerably. If this method is used, the amount and quality of the vapor which leaves the tower and enters a fractionating tower (not shown) may vary considerably causing the operation of the fractionating tower to be difficult to control.

One object of the invention is to provide a method and apparatus for keeping the liquid level in a packed tower constant.

Another object is to keep the quality and the rate of effluent vapors leaving the packed tower uniform.

Another object of this invention is to provide a method of controlling the liquid level in packed and unpacked towers.

Another object of the invention is to provide an apparatus for controlling the liquid level in packed and unpacked towers.

Another object is to provide a method of and apparatus for keeping the quality and the rate of flow of effluent vapors leaving the tower uniform.

Another object is to control the level in a tower by addition of either vapor or liquid to the upper portion of the liquid already in the tower, whereby increased or decreased evaporation restores the correct level of the liquid without delay.

Other objects are to control the liquid level during isomerization, fractionation, catalytic action, stripping, or other operation in a tower.

A further object of the invention is to provide simple, fool-proof, inexpensive means for carrying out the above objects.

Numerous other objects and advantages will be obvious to those skilled in the art upon reading the accompanying specification, claims and drawings.

In the drawings:

The drawing is an elevational diagrammatic view of a packed evaporating tower equipped with an illustrative embodiment of the invention.

In the drawing a liquid feed made up from one or more streams of liquids coming from a plurality of supply lines 1 and 2 in proportions set by control valves such as 3 may flow by gravity or be pumped by pump 4 if necessary through line 5 into chamber 6. Chamber 6 is heated by heater 7 and contains a float 8 and its operating lever 9. The vapor 10 formed in chamber 6 passes out through a vapor product line 11 which leads to a condenser 12 of any suitable type in which cooling fluid coming in pipe 13 and flowing out pipe 14 is passed in indirect heat exchange with the vapor 11 to condense it. Countercurrent flow is preferably maintained in heat exchanger 12 in order that the condensed liquid product emerging through line 15 may be as cool as the given temperature of cooling fluid in line 13 can make it.

The condensed vapor coming down line 15 is mainly taken off through line 16 controlled by valve 17 as a liquid product. Some of the condensed liquid product passes through reflux line 18 controlled by valve 19. The relative amounts of liquid product passing through lines 16 and 18 can be regulated through the entire range by adjusting valves 17 and 19.

The condensed liquid product in line 18 may be aided in its flow by pump 20 and passes through heater 21 and a reflux line 22 into an upper portion of chamber 6 in the vicinity of liquid level 23 either on top or in the top portion of packing material 24 but preferably below the desired liquid level 23.

Line 18 after passing through pump 20 enters a heater or heat exchanger 21. While line 18 is shown as expanding to the full size of heater 21 it is not intended that any particular heater or heat exchanger be employed, as any heater old in the art that can be controlled as to its temperature may be substituted in practicing the invention.

From heater 21 the liquid product to be refluxed passes through line 22 (which is an extension of line 18) into tower 6 at a level higher than the point of entry of line 5, the level of entry of line 22 being preferably adjacent the level 23 at which it is desired to maintain the liquid 25 inside of chamber 6, the reason for which being explained in the operation of the device.

While any controllable heating means may be employed, I have shown a steam supply line 26 leading to heater 21 and a steam exhaust line 27 leading away from 21, and as customary with steam lines the exhaust is preferably lower than the supply line so that water of condensation may leave the system through line 27. By having the steam pass in countercurrent flow to the liquid stock in heater 21, a higher temperature may be obtained in the stock in line 22 for any set temperature of steam in line 26.

The flow of steam from supply line 26 to heater 21 is controlled by valve 28. Floating in the liquid 23 in tower 6 is a float 8. The shape of float 8 is immaterial. Float 8 is connected by a lever arm 9, and other suitable mechanical linkage 29 to a transmission means 30. Transmission means 30 may be a rod rotated by lever arm 9 as float 8 moves up and down, but the invention is not limited to the specific lever arm 9 nor transmission means 30, as any transmission means, either mechanical, electrical or working on any principle known to the art may be substituted for the transmission means shown and the invention will still be practiced.

Transmission means 30 is connected to valve 28 to control the position of the valve. When float 8 is high valve 28 is open, and when float 8 is low valve 28 is closed, the valve taking intermediate positions in response to intermediate positions of the float. Obviously, any known control means between the float and the valve may be employed in practicing the invention.

When fractionation is desired it is often convenient to feed the liquid feed to be fractionated in through pipe 31 controlled by valve 32 and take a light fraction of product overhead through pipe 11 and a heavy fraction of product down through pipe 33 controlled by valve 34. When stripping operations are desired, the stripping vapor or gas can be injected through pipe 5 to strip the liquid feed entering through pipe 31.

In all operations liquids in pipe 5 can be injected into 6 in the vapor phase if desired, by closing valve 35, opening valve 36 and heating the liquid feed in bypass pipe 37 by steam in line 38 in heater 39, the temperature being controlled by thermostat 40 controlling valve 41. In such operations heater 7 is generally shut down, or reduced in heating effect to retain liquid 25 with a level at 23, which level is then controlled as set forth herein. It is the method and meanse for control of this liquid level 23 that constitutes the present invention.

Packing 24 is not necessarily present, but its presence so aggravates the level control problem that the present invention becomes of vital importance. It is the unexpected ability of the present invention to control the liquid level so well in the presence of such packing 24 which makes the present invention particularly valuable in such instances.

Packing 24 may be the usual rings, brick bats, or other packing. It may contain catalyst when catalytic action is desired. In the mixed phase or single phase isomerization of normal butane to isobutane packing 24 is preferably bauxite coated with a metal halide, preferably aluminum chloride, as taught by Henry 2,366,028, December 26, 1944, in which case butane feed can come in line 1 as in 14 of Henry, hydrogen chloride in line 2, as in 24 of Henry, and aluminum chloride in line 42 controlled by valve 43, as in line 30 of Henry. Or conversely, the present liquid level control can be substituted for control 38 of Henry.

It is often desirable to pack tower 6 with granular packing material 24. Granular packing material 24 may be of any size depending entirely upon what type of operation is being carried on in tower 6 and may be a catalyst or merely inert packing. The packing 24 may be employed to provide closer fractionation, stripping, or chemical reactions including catalytic actions or physical rearrangements. Packing 24 is necessitated by whatever process is being employed that requires it, and so far as the present invention is concerned merely acts to aggravate the problem of controlling the liquid level in the tower, and in this way it forms a combination with the liquid level control because other methods of liquid level control known to the prior art become inoperative when applied to a packed tower. This is because of the lag in time between the making of an adjustment in the heating of the tower and the time when the surface 23 of liquid 25 begins to increase in evaporation. This long time lag caused by the long bed of boiling liquid results in surging during which packing 24, which may be of a nature requiring constant submergence, is exposed to vapors 10 in the top of tower 6.

While tower 6 has been shown as having a single vapor product outlet 11, obviously a number of such outlets may be located at spaced points in the upper portion of the tower, and while packing material 24 has been shown as granular material such as broken stone it is obvious that some form of baffle plate, or bubble tray, or a series of such might be substituted for material 24. In such modifications where there are a plurality of vapor product lines in the upper portion of the tower granular material such as 24 or the baffles or bubble trays mentioned may be placed in the upper part of tower 6 between the various vapor product lines without departing from the invention, it being obvious that as long as space is provided for float 8 to be moved up and down through a suitable range above and below the desired level 23 of liquid 25 in tower 6 that the present invention will still be practiced.

The liquid feed to be evaporated comes in lines 1 and 2 and is pumped by pump 4 through lines 5 or 37 and 5 into chamber 6. The amount that passes through lines 1 and 2 respectively is controlled by adjusting valve 3. Heat is applied, at 7 for example, to chamber 6 causing evaporation of liquid 25 therein and the vapor passes out through line 11. Float 8 floats on the surface 23 of liquid 25.

If the amount of liquid feed being pumped in through line 5 is chosen so that a little more liquid is being supplied than heater 7 will evaporate, then float 8 will rise and move lever 9 and linkage 29 and 30 to open valve 28. Hot steam from supply line 26 then passes through heater 21. As hot liquid product or vapor product is now being pumped in at 22 the amount of heat added to liquid 25 is raised, and as the pressure conditions in the top of 6 are assumed to be the same the increased heat causes increased evaporation.

As the increased evaporation carries the vaporized liquid product out line 11 faster than the liquid feed is entering chamber 6, the liquid level of liquid 25 falls and float 8 falls with it. This moves lever 9 and linkage 29 and 30 to close valve 28, shutting off the steam and allowing heater 21 to cool. The product in line 22 not being so hot, it does not add as much heat to liquid 25 as formerly and the amount of vapor caused by evaporation is reduced. As less liquid is being evaporated than is entering chamber 6, the liquid level 23 rises inside chamber 6. This has been described as though it were a hunting operation, but such is not the case in practice, as any float 8, known to the prior art, will take a position and maintain it with little change, maintaining the level 23 of liquid 25 at substantially the desired level, and the opening and closing movements of valve 28 will generally be so small and so slowly executed as to hardly be noticeable.

The vapor product passing through line 11 is condensed in condenser 12 by heat exchange with cooling fluid in line 13.

The condensed liquid product in line 18 is then heated in heater 22.

It should be understood throughout the application that the product material going to the top of the tower through 22 may range from a sub-cooled liquid product to a super-heated vapor product, depending on the amount of heat being supplied to the heater 21 on this control stream which in turn depends on the location of the liquid level in the tower. In the drawing cooler 12 may sub-cool liquid for line 18 and when heater 21 is off sub-cooled liquid enters tower 6 through line 22. When heater 21 is on full this liquid product may be turned to super-heated vapor product.

As pointed out above the liquid feed or liquids from pipes 1 and 2 may be heated in 39 and come through pipe 5 into chamber 6 as a vapor, either for stripping, mixed phase isomerization, or other operations, and can be used to furnish the heat for simple evaporation, which reduces or eliminates the use of heater 7.

A number of varied operations have been described in order to demonstrate the utility of the present invention. This invention is especially applicable to the mixed-phase isomerization process, such as described in the patent to Henry 2,366,028 cited above, where a boiling hydrocarbon liquid feed is evaporated in a reaction chamber containing deposited aluminum chloride.

In such an isomerization process, normal butane feed from 5 is isomerized to isobutane by evaporating a hydrocarbon liquid mixture containing normal butane in a reaction chamber 6 in the presence of an aluminum halide catalyst on 24 under appropriate conditions of temperature, pressure, etc. Isobutane product is withdrawn through 11 from the reaction chamber with the vapor product effluent and may be subsequently separated by fractionation. A portion 18 of the isobutane product stream 15 may be recycled to the reaction chamber 6 via pipe 22 as a heated reflux to control the liquid level of the evaporating hydrocarbon mixture in the reaction chamber similar to the manner described herein.

In general, the available heat supplied by the level controlling fluid product itself is about 2 to 5 per cent of the total heat required to evaporate the liquid at a rate equivalent to the rate of feed entering the evaporating chamber. However, as much as 10% or more of the heat of evaporation may be supplied by the level controlling fluid product if necessary.

To those skilled in the art it will appear evident that other types of apparatus or elements thereof capable of achieving the same result may be substituted for portions of the apparatus in this invention and it will also appear that certain apparatus may be omitted under some conditions of operation. These, however, constitute only minor changes in operation and are naturally within the scope of the invention.

Having described preferred forms of the present invention and having pointed out the principal considerations to be observed in the construction and operation of equivalent systems, it is obvious that various other changes can be made without departing from the scope of the invention, which is defined only by the following claims.

I claim:

1. The method of controlling the liquid level of liquid being evaporated in an evaporator at substantially a desired level comprising the steps of feeding liquid feed at a substantially uniform rate to a lower level of the evaporator, collecting the vapor product from the evaporator to form a product and feeding some of the product at a substantially uniform rate to an upper level of the evaporator, the total feed being at a rate slightly greater than the normal rate of evaporation of the liquid in the evaporator without additional heating, and heating the product being fed to said upper level when the liquid rises in the evaporator to increase the evaporation and keep the liquid in the evaporator substantially at said desired level.

2. Apparatus of the class described comprising in combination an evaporating tower having an outlet for vapor product, means to heat said tower, a liquid feed supply line, pumping means in said supply line, said supply line communicating with said tower at a low level, a vapor product line connected to said outlet, a condenser connected to said vapor product line, a condensed liquid product line connected to said condenser, a first valve in said condensed liquid product line, a product line connected to said condensed liquid product line between said condenser and said first valve, a second valve in said product line, said condensed liquid product line communicating with said tower at a high level, packing material in said tower between said low level and said high level, pumping means and heating means in said condensed liquid product line, and float means in said tower controlling said last named heating means and thereby the level of liquid in said tower through the rate of evaporation thereof.

3. Apparatus of the class described comprising in combination an evaporating tower having an outlet for vapor product, a liquid feed supply line, said supply line communicating with said tower at a low level, a vapor product line connected to said outlet, a condenser connected to said vapor product line, a condensed liquid product line connected to said condenser, a first valve in said condensed liquid product line, a product line connected to said condensed liquid product line between said condenser and said first valve, a second valve in said product line, said condensed liquid product line communicating with said tower at a high level, packing material in said tower between said low level and said high level, heating means in said condensed liquid product line, and float means in said tower controlling said heating means and thereby the level of liquid in said tower through the rate of evaporation thereof.

4. Apparatus of the class described comprising in combination an evaporating tower having an outlet for vapor product, means to heat said tower, a liquid feed supply line, said supply line communicating with said tower at a low level, a vapor product line connected to said outlet, a condenser connected to said vapor product line, a condensed liquid product line connected to said condenser, a product line connected to said condensed liquid product line, said condensed liquid product line communicating with said tower at a high level, packing material in said tower between said low level and said high level, heating means in said condensed liquid product line, and float means in said tower controlling said last named heating means and thereby the level of liquid in said tower through the rate of evaporation thereof.

5. Apparatus of the class described comprising in combination an evaporating tower having an outlet for vapor product, a liquid feed supply line, said supply line communicating with said tower at a low level, a vapor product line connected to said outlet, a condenser connected to said vapor product line, a condensed liquid product line connected to said condenser, a product line connected to said condensed liquid product, said condensed liquid product line communicating with said tower at a high level, heating means in said condensed liquid product line, and float means in said tower controlling said heating means and thereby the level of liquid in said tower through the rate of evaporation thereof.

6. In a mixed phase isomerization process for the isomerization of a normal butane feed to an isobutane product in the presence of an aluminum halide catalyst in which a liquid is evaporated in a reaction chamber, the method of maintaining a substantially constant level of said liquid in said reaction chamber which comprises passing a hydrocarbon feed comprising normal butane into said reaction chamber at a rate substantially equivalent to the evaporation of liquid therein, evaporating and withdrawing a liquid hydrocarbon product comprising isobutane therefrom, heating and injecting a portion of said hydrocarbon product in a liquid state into said reaction chamber adjacent to a desired liquid level of said evaporating liquid under conditions such that the available heat is increased when the liquid level rises to increase the rate of evaporation and the available heat is decreased when the liquid level recedes below said desired liquid level to decrease the rate of evaporation.

JOSEPH E. STORMENT.

REFERENCES CITED

The following references are of record in the file of this patent:

UNITED STATES PATENTS

| Number | Name | Date |
|---|---|---|
| 2,277,070 | Carney | Mar. 24, 1942 |
| 2,358,182 | Orem | Sept. 12, 1944 |
| 2,366,028 | Henry | Dec. 26, 1944 |
| 2,387,993 | Hepp | Oct. 30, 1945 |
| 2,388,931 | Nelson | Nov. 13, 1945 |
| 2,473,737 | Storment | June 21, 1949 |